UNITED STATES PATENT OFFICE.

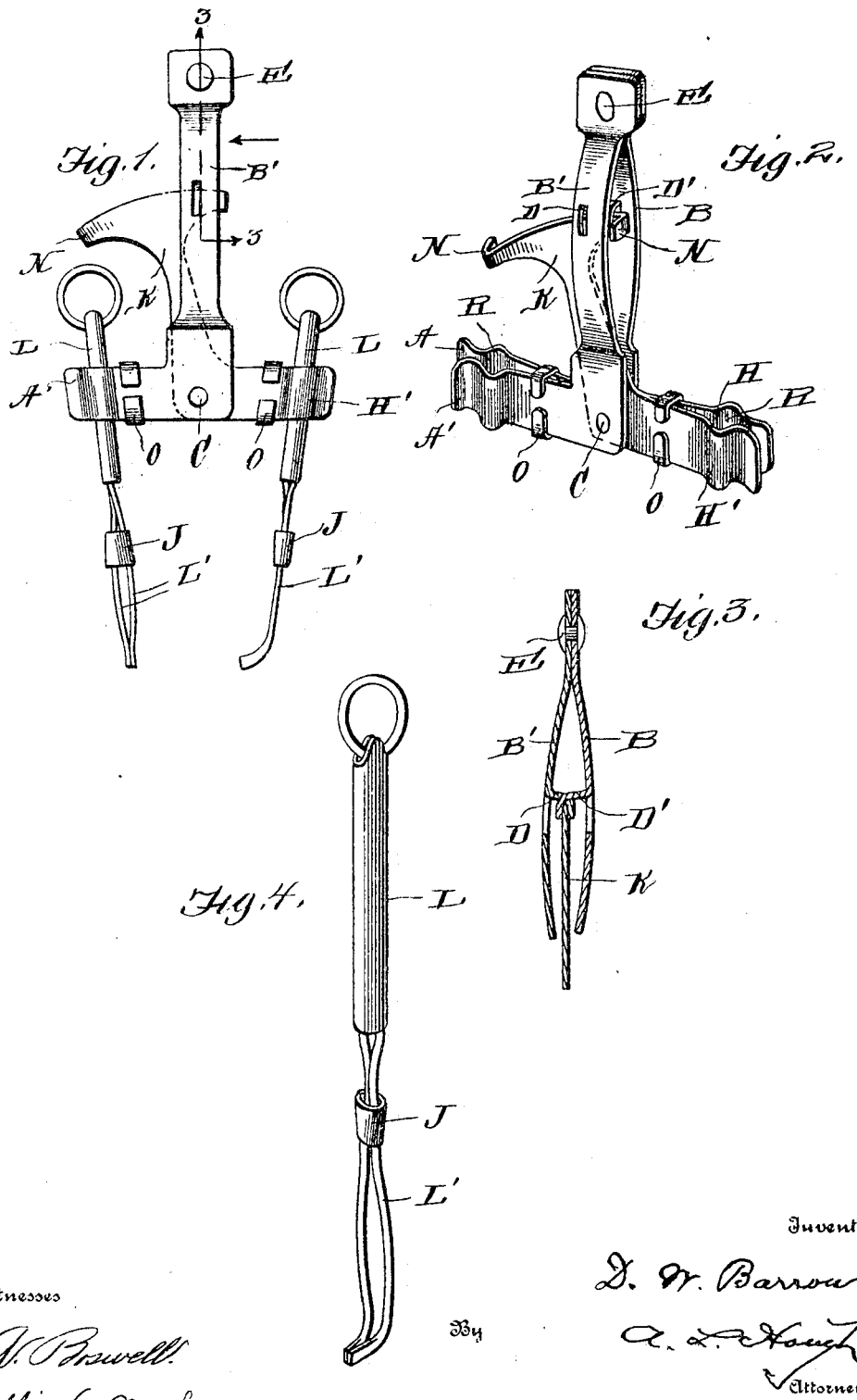

DAVID W. BARROW, OF CHATTANOOGA, TENNESSEE.

APPARATUS FOR HOLDING PLIERS.

No. 799,026.  Specification of Letters Patent.  Patented Sept. 12, 1905.

Application filed October 28, 1904. Serial No. 230,395.

*To all whom it may concern:*

Be it known that I, DAVID W. BARROW, a citizen of the United States, residing at Chattanooga, in the county of Hamilton and State of Tennessee, have invented certain new and useful Improvements in Apparatus for Holding Pliers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in devices for holding pliers; and it consists in the provision of a simple and efficient means whereby pliers may be clamped and held in adjusted positions and so arranged that articles engaged by the pliers may be held in various positions with relation to each other for convenience in soldering the same.

The invention consists, further, in various details of construction and in combinations and arrangements of parts, which will be hereinafter fully described and then specifically defined in the appended claims.

My invention is illustrated in the accompanying drawings, in which—

Figure 1 is a side elevation of the apparatus, showing the pliers clamped in position. Fig. 2 is a perspective view of the apparatus, showing the pliers removed. Fig. 3 is a sectional view on line 3 3 of Fig. 1, and Fig. 4 is an enlarged detail view of one of the pair of pliers.

Reference now being had to the details of the drawings by letter, A and A' designate two jaws which are integral, respectively, with the shank portions B and B', and C is a pivot-pin passing through the lower shank portions of the jaws. Upon the inner faces of said shank portions B and B' are projections D and D', having angled ends, the former of which projections is integral with the shank portion A', while the latter is integral with the shank portion A. Said projections are bent at substantially right angles, as shown clearly in Fig. 3 of the drawings, and the two shank portions A and A' are outwardly bowed, while their upper ends are held by means of a rivet E. The jaws H and H' have a shank portion K, the end of which flares, as shown in the drawings, and terminates in right-angled or hooked portions N, (shown clearly in Fig. 2 of the drawings,) said angled ends being provided to limit the rocking movement of the shank portion K by coming in contact with one edge or the other of the shank portions B or B', accordingly as the jaws H and H' are tilted in one direction or the other, as will be readily understood. Upon reference to Fig. 3 of the drawings it will be observed that the upper part of the shank portion K has a movement between the angled ends of said projections D and D', and normally the inner edges of each of said projections is adapted to frictionally bear against the opposite faces of the shank portion K for the purpose of holding the two pairs of jaws at different angles to each other. By compressing the two bowed shank portions A and A' it will be observed that said projections will be free from the opposite faces of the shank portion K, allowing the latter to tilt freely upon its pivot C.

In order to hold the clamping-jaws together, I provide movable straps O, which, passing about the jaws, may be moved toward the free ends of said jaws for the purpose of clamping the shank portions L of the pliers in the concaved portions R of said jaws. Said pliers, a detail view of one pair of which is shown in Fig. 4 of the drawings, have a cylindrical portion with two flexible arms L' projecting therefrom, while a movable collar J is mounted upon said arms, and as it is pushed against the outwardly-curved portion thereof the jaws of the pliers will be held in a clamping relation.

In adjusting the pliers to the clamping-jaws the shank portions L are inserted in the recesses or grooves R and the straps O pushed toward the pliers, thus causing the jaws to frictionally engage the cylindrical shank portions L. Said jaws of the shank portions which hold the pliers may be made to engage the pliers at any portions thereof, and by the tilting of the jaws holding the pliers it will be observed that articles carried by the pliers may be held in any positions relative to each other, thus affording a simple and efficient means for holding articles while being soldered.

While I have shown a particular detailed construction of apparatus illustrating my invention, it will be understood that I may vary the details, if desired, without in any way departing from the spirit of the invention.

Having thus fully described my invention, what I claim as new, and desire to secure by Letters Patent, is—

1. An apparatus for holding pliers comprising two pairs of jaws pivoted together, the shank portions of two of said jaws having projections extending toward each other and designed to frictionally engage the opposite faces of the shank portion of the other pair of jaws, the ends of the shank portion of the jaws engaged by said projections being angled and adapted to contact against the opposite edges of the shank portions having said projections, and means for holding pliers in said jaws, as set forth.

2. An apparatus for holding pliers comprising two sets of jaws pivotally connected together, the shank portions of one set of jaws being outwardly bowed and adapted to yield toward each other, projections having angled ends extending on the inner faces of said bowed shank portions, the shank portion of the other set of jaws flaring laterally and terminating in angled ends which are adapted to contact with the edges of said bowed shank portions to limit the tilting movements of the jaws, said projections adapted to contact with the opposite faces of said flaring portion, and means for holding the pliers in said jaws, as set forth.

In testimony whereof I hereunto affix my signature in presence of two witnesses.

DAVID W. BARROW.

Witnesses:
H. W. HOWELL,
IKE POSS.